United States Patent [19]

Kielma

[11] 4,329,770
[45] May 18, 1982

[54] AUTOMATIC TOOL CHANGER

[75] Inventor: Ervin J. Kielma, West Allis, Wis.

[73] Assignee: Kearney & Trecker Corporation, West Allis, Wis.

[21] Appl. No.: 145,853

[22] Filed: May 1, 1980

[51] Int. Cl.³ .......................................... B23Q 3/155
[52] U.S. Cl. ..................................................... 29/568
[58] Field of Search ................... 29/568; 414/736, 739, 414/744 A

[56] References Cited

U.S. PATENT DOCUMENTS

| | | | |
|---|---|---|---|
| 3,273,235 | 9/1966 | Dziedzil et al. | 29/568 |
| 3,516,149 | 6/1970 | Milkas | 29/568 |
| 3,524,248 | 8/1970 | Durr et al. | 29/568 |
| 3,587,873 | 6/1971 | Lohneis | 29/568 |
| 3,822,466 | 7/1974 | Noguchi et al. | 29/568 |
| 3,930,301 | 1/1976 | Wagner | 29/568 |
| 4,050,146 | 9/1977 | Geier | 29/568 |
| 4,126,233 | 11/1978 | Jeske | 29/568 X |
| 4,288,909 | 9/1981 | Kielma et al. | 29/568 |

FOREIGN PATENT DOCUMENTS

| | | | |
|---|---|---|---|
| 49-43285 | 4/1974 | Japan | 29/568 |
| 1198763 | 7/1970 | United Kingdom | 29/568 |

Primary Examiner—William R. Briggs
Attorney, Agent, or Firm—Cyril M. Hajewski; Robert B. Levy

[57] ABSTRACT

An automatic tool changer for a machine tool having a rotary toolhead with cross-feed slide includes a tilt unit having a tool socket which is pivotal between a first position, parallel to the axis of a machine tool storage magazine to permit loading or unloading of a machine tool carrier into the tool socket from the tool storage magazine by a transfer arm, and a second position parallel to the axis of the rotary toolhead. A tool changer arm, having tool grippers at opposite ends, moves along and rotates about an axis parallel to the rotary toolhead to exchange the tool carrier in the tool socket of the tilt unit with the tool carrier in the rotary toolhead, thereby permitting a new machining operation to be performed by the machine tool as well as storage of the machine tool carrier previously held in the rotary toolhead.

2 Claims, 2 Drawing Figures

AUTOMATIC TOOL CHANGER FOR ROTARY TOOLHEAD WITH CROSS-FEED TOOL SLIDE

BACKGROUND OF THE INVENTION

This invention relates to automatic tool changers for rotary toolheads with cross-feed tool slides such as disclosed, for example, in co-pending U.S. Patent Application, Ser. No. 751,962, which was filed on Dec. 17, 1976, by Ervin J. Kielma, Frank J. Schalk and Kenneth J. Merkel, for a "Machine Tool With Counterposed Rotary Toolheads Carrying Cross-feed Tool Slides". Said copending patent application discloses two rotary toolheads each of which carries two cross-feed tool slides on which tools are mounted. But, the tools have to be mounted on the tool slides by hand, which is difficult with large tools and is time-consuming even with small tools. Accordingly, the principle object of this invention is to provide an automatic tool changer which is adapted to automatically change tools on a cross-feed tool slide which is mounted on a rotary toolhead. Other objects and advantages of the invention will be apparent from the detailed description herein.

SUMMARY OF THE INVENTION

A tool change arm is rotatably mounted on a frame for rotation about an axis parallel to the axis of a rotary toolhead which carries a cross-feed tool slide. The tool change arm is double-ended and has a tool gripper on each end. The tool change arm is axially movable along its axis. A tilt unit is rotatably mounted on the frame for movement between a position parallel to the axis of the rotary toolhead and a position perpendicular to the axis of the rotary toolhead. A tool transfer arm is rotatably mounted on the frame in position to transfer toolholders between a tool storage magazine and the tilt unit. The tool transfer arm has a tool gripper on one end and is movable along its axis.

DETAILED DESCRIPTION OF THE INVENTION

Figure 1:
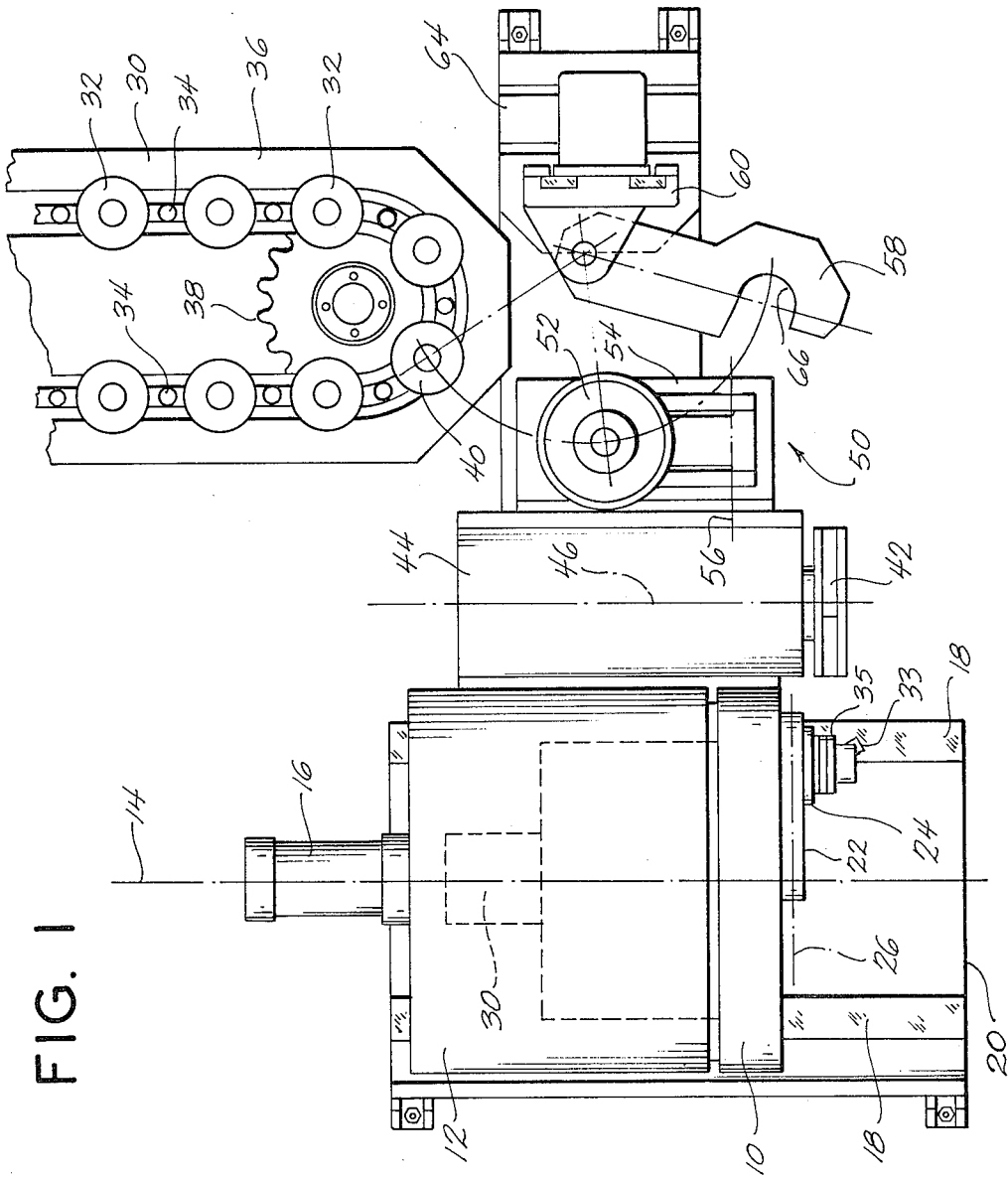
FIG. 1 is a plan view of one embodiment of the invention.
Figure 2:
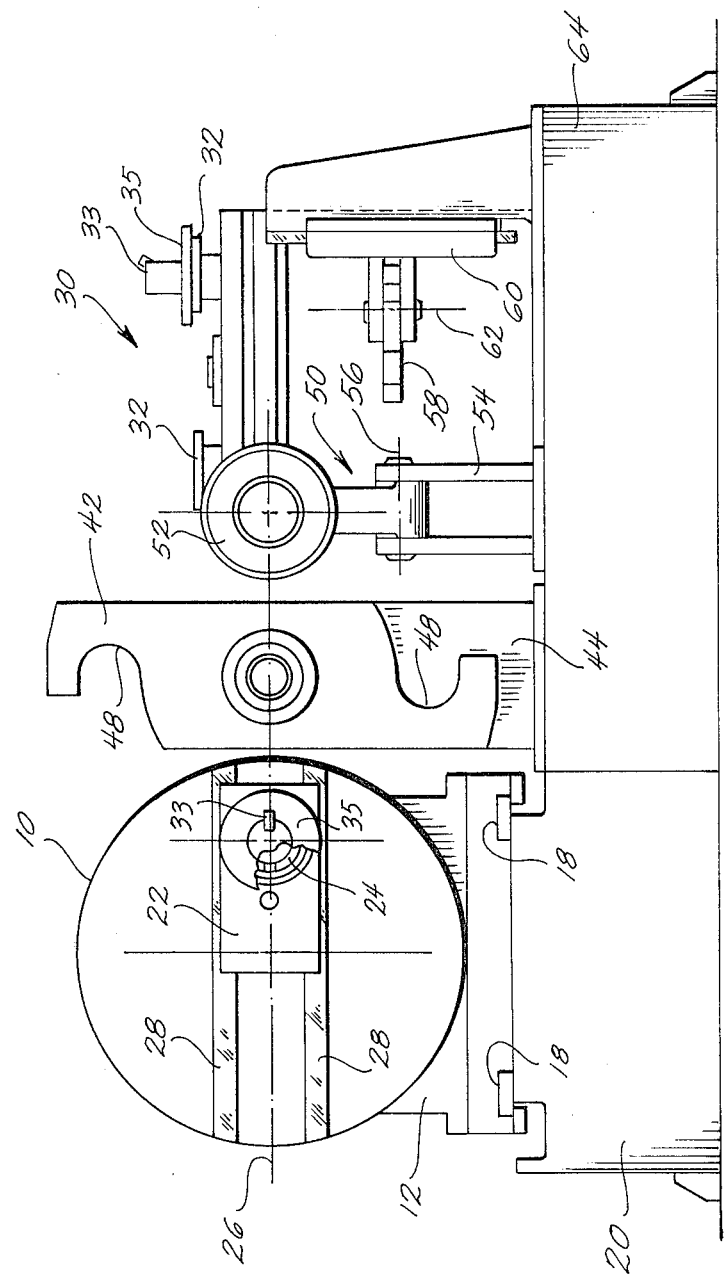
FIG. 2 is a front elevational view of the embodiment shown in FIG. 1.

Referring to FIGS. 1 and 2, the automatic tool changer of this invention is used in combination with a rotary toolhead 10 which is rotatably mounted in a housing 12 for rotation about a horizontal axis 14 (FIG. 1). Rotary toolhead 10 is rotated by an electric motor 16 (FIG. 1) which is mounted on housing 12 and is connected to rotary toolhead 10 by conventional gears (not shown). Housing 12 is slidably mounted on horizontal ways 18 for movement along axis 14. Ways 18 are supported by a bed 20. Housing 12 is moved along ways 18 by a conventional electric motor and ballscrew drive (not shown) which are controlled by conventional control circuits (not shown).

A cross-feed tool slide 22 carrying a tool clamp 24 is slidably mounted on rotary toolhead 10 for movement along an axis 26 which is perpendicular to axis 14 (FIG. 1). Tool slide 22 moves along ways 28 (FIG. 2) on the face of rotary toolhead 10 and is driven by an electric motor 30 (FIG. 1) which is coupled to tool slide 22 by conventional gears (not shown). Motor 30 is mounted on rotary toolhead 10 and rotates therewith. Hence the electrical power for motor 30 is applied thereto via slip-rings (not shown). The previously identified co-pending patent application shows how the slip-rings are mounted and also shows the requisite gearing for coupling motor 16 to rotary toolhead 10 and for coupling motor 30 to tool slide 22.

Tool clamp 24 is adapted to receive and hold a standard toolholder carrying a tool for cutting a stationary workpiece (not shown) held by a conventional worktable (not shown).

The automatic tool changer of this invention is similar to the automatic tool changer disclosed in co-pending Patent Application, Ser. No. 954,438 (now U.S. Pat. No. 4,288,909), which was filed by Ervin J. Kielma, Albin J. Schabowski and John T. Currer, for an "Automatic Tool Changer For Machine Tool". The tool changer includes a tool storage magazine 30 which has a plurality of tool sockets 32 which are joined together by a chain 34 (FIG. 1) and are entrained in a closed horizontal path by a supporting structure 36 and sprockets 38. Only a portion of tool storage magazine 30 is shown since it can be identical to the tool storage magazine shown in the above-noted co-pending Patent Application, Ser. No. 954,438. Tool storage magazine 30 includes a motor (not shown) for driving sprockets 38 along the conventional control means (not shown) for positioning any one of the tool sockets 32 at a ready position 40 to interact with the other portions of the tool changer.

Each of the tool sockets 32 are adapted to receive a standard cylindrical shank toolholder (not shown) on which a turning tool (not shown) is mounted. Although the tool changer disclosed in the above-noted co-pending Patent Application, Ser. No. 954,438, is adapted to handle both single toolholders and multiple spindle toolheads, the multiple spindle toolheads are not used in this invention.

The tool changer also includes a tool change arm 42, which is mounted on a frame 44 for rotation about a horizontal axis 46 (FIG. 1) and for axial movement along axis 46 between a forward and rear position. The rear position is shown in FIG. 1. Axis 46 is parallel to axis 14. Tool change arm 42 has a tool gripper 48 (FIG. 2) on each end thereof and serves to transfer toolholders from tool clamp 24 to a tilt unit 50 and from tilt unit 50 to tool clamp 24. Tool grippers 48 can be the same as the tool grippers shown in co-pending Patent Application, Ser. No. 954,438.

Tilt unit 50 has a socket 52 which is pivotally mounted on a frame 54 for rotation about a horizontal axis 56 which is perpendicular to axes 14 and 46. Socket 52 can be rotated by 90° from a vertical position shown in FIG. 1 to a horizontal position shown in FIG. 2. Socket 52 is adapted to received a toolholder and to clamp the toolholder therein. In its horizontal position shown in FIG. 2, socket 52 is in position to transfer a toolholder to tool change arm 42 or receive a toolholder from tool change arm 42. In its vertical position, shown in FIG. 1, socket 52 is in position to receive toolholders from or transfer toolholders to a tool transfer arm 58, which is rotatably mounted on a slide 60 for rotation about a vertical axis 62 (FIG. 2). Slide 60 is slidably mounted on a frame 64 for movement along axis 62 between an upper and lower position. The lower position is shown in FIG. 2.

Tool transfer arm 58 has a tool gripper 66 (FIG. 1) which is adapted to grip a toolholder to transfer the toolholder from tool magazine 30 to tilt unit 50 and vice versa. Tool transfer arm 58 is rotatable between three positions: a forward position, shown in FIG. 1; a central position in operative relation with tilt socket 52; and a rear position in operative relation with the tool magazine socket 32 at ready position 40. Tool change arm 42, tilt unit 50 and tool transfer arm 58 can be identical to the corresponding parts in co-pending Patent Application, Ser. No. 954,438.

The tool changing cycle of the above-described automatic tool changer will be described starting with the following conditions:

(a) A tool is clamped in tool clamp 24 and the turning operation with that tool has been completed.

(b) Tool change arm 42 is empty on both ends and is in the retracted vertical position shown in FIG. 2.

(c) Tilt socket 52 is empty and is in the vertical position shown in FIG. 1.

(d) Tool transfer arm 58 is empty and is in the forward lower position shown in FIG. 1.

(e) The next tool which is to be used in rotary toolhead 10 is at the ready position 40 (FIG. 1) in tool magazine 30.

Under the above-noted initial conditions, the tool change operation proceeds as follows:

(1) Rotary toolhead 10 is moved to the tool change position shown in FIG. 1, and simultaneously, tool slide 22 is moved to the tool change position shown in FIG. 2.

(2) Tool transfer arm 58 is rotated from its forward position to its rear position to grip the toolholder at ready position 40.

(3) Tool transfer arm 58 is raised to lift the toolholder out of its tool socket 32.

(4) Tool transfer arm 58 is rotated from its rear position to its central position above tilt socket 52.

(5) Tool transfer arm 58 is lowered to insert the toolholder into tilt socket 52.

(6) The toolholder is released from tool transfer arm 58 and is clamped in tilt socket 52.

(7) Tool transfer arm 58 is rotated to its forward position.

(8) Tilt socket 52 is rotated to its horizontal position shown in FIG. 2.

(9) Tool change arm 42 is rotated 90° counterclockwise to simultaneously grip the toolholders in tool clamp 24 and the toolholder in tilt socket 52.

(10) The toolholders in tool clamp 24 and tilt socket 52 are unclamped.

(11) Tool change arm 42 is moved forward to simultaneously remove the toolholders from tool clamp 24 and tilt socket 52.

(12) Tool change arm 42 is rotated 180° clockwise to interchange the positions of the toolholders removed from tool clamp 24 and tilt socket 52.

(13) Tool change arm 42 is moved rearward to insert the interchanged toolholders into tool clamp 24 and tilt socket 52.

(14) The toolholders in tool clamp 24 and tilt socket 52 are clamped and then released from tool change arm 42.

(15) Tool change arm 42 is rotated 90° counterclockwise back to its initial position. Machining can now commence with the new tool in tool clamp 24.

(16) Tilt socket 52 is rotated to its vertical position.

(17) Tool change arm 58 is rotated to its central position to grip the toolholder in tilt socket 52.

(18) The toolholder in tilt socket 52 is unclamped.

(19) Tool change arm 58 is raised to remove the toolholder from tilt socket 52.

(20) Tool change arm 58 is rotated to its rear position above ready position 40.

(21) Tool change arm 58 is lowered to insert the toolholder therein into the tool socket 32 at ready position 40.

(22) The toolholder is released from tool change arm 58, and tool change arm 58 is rotated to its forward position.

Although the means for rotating tool change arm 42 and tool transfer arm 58 and for moving them along their rotary axis is not shown in the drawings, the same means disclosed in the above-noted co-pending Patent Application, Ser. No. 954,438, can be employed. Also, the same tool grippers and tool clamps disclosed in co-pending Patent Application, Ser. No. 954,438, can be used in this invention.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In combination with a machine tool having a bed, a housing slidably mounted on said bed, a rotary driven toolhead journaled into said housing for rotation about and transverse movement along a first axis, said toolhead having a cross feed facing slide slidably mounted thereon for movement thereacross along a second axis perpendicular to, but lying in the same plane, as said first axis and said cross feed facing slide having a means thereon for receiving and releaseably engaging a toolholder thereto, an automatic tool changer comprising:

a frame stationary with respect to said toolhead;

a tool storage magazine mounted on said frame, said tool storage including a plurality of sockets each adapted to vertically store a toolholder;

a tool change arm rotatably journaled in said frame for rotation about, and axial movement along an axis parallel to said first axis, said tool change arm having a tool gripper at each end thereof positioned so that each tool gripper is operative to transfer a toolholder to said cross feed facing slide and to transfer a toolholder from said cross feed facing slide;

means for receiving a toolholder and for changing the orientation of said toolholder from a vertical orientation at which said toolholder is parallel to the toolholders stored in said tool storage magazine to a horizontal orientation at which said toolholder is parallel to said toolholder in said cross feed facing slide to enable transfer of said toolholder received by said means to said cross feed facing slide by said tool change arm and for changing the orientation of a toolholder received from said tool change arm from a horizontal to a vertical orientation to enable return of said toolholder to said tool storage magazine; and a second tool change arm for transferring tools between said tool storage magazine and said means for receiving said toolholder and for changing the orientation of said toolholder.

2. The invention according to claim 1 wherein said means for receiving said toolholder and for changing the orientation thereof comprises a tilt unit.

* * * * *